(12) United States Patent
Drasal et al.

(10) Patent No.: US 12,710,443 B2
(45) Date of Patent: Aug. 18, 2026

(54) TECHNIQUES FOR ASSURING ACCURACY OF AIR-DATA SYSTEMS

(71) Applicant: Honeywell International Inc., Charlotte, NC (US)

(72) Inventors: Zbynek Drasal, Prague (CZ); Jan Pekarek, Brno (CZ); Thomas Dobbins, Watertown, MN (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 274 days.

(21) Appl. No.: 18/678,257

(22) Filed: May 30, 2024

(65) Prior Publication Data

US 2025/0369998 A1 Dec. 4, 2025

(51) Int. Cl.

| | |
|---|---|
| ***G01P 5/26*** | (2006.01) |
| ***B64D 43/02*** | (2006.01) |
| ***B64F 5/60*** | (2017.01) |
| ***G01P 5/16*** | (2006.01) |
| ***G01P 5/165*** | (2006.01) |
| ***G01P 13/02*** | (2006.01) |
| ***G01S 17/58*** | (2006.01) |
| *G01P 21/02* | (2006.01) |

(52) U.S. Cl.

CPC .............. *G01P 13/025* (2013.01); *B64F 5/60* (2017.01); *G01P 5/165* (2013.01); *B64D 43/02* (2013.01); *G01P 21/02* (2013.01); *G01S 17/58* (2013.01)

(58) Field of Classification Search

CPC ........ G01P 13/025; G01P 5/165; G01P 21/02; G01P 5/26; G01P 5/16; G01P 21/025; B64F 5/60; B64D 43/02; G01S 17/58

See application file for complete search history.

(56) References Cited

U.S. PATENT DOCUMENTS 6,941,806 B2 * 9/2005 Burns ................ G01N 33/0075 73/170.01
7,106,447 B2 9/2006 Hays (Continued)

FOREIGN PATENT DOCUMENTS

CN 1656360 A * 8/2005 ............. G01F 1/666
CN 114167391 A 3/2022

(Continued)

OTHER PUBLICATIONS

Kaminer, Isaac, et al. "Rapid Flight Test Prototyping System and the Fleet of UAV's and MAVs at the Naval Postgraduate School." AIAA 3rd "Unmanned Unlimited" Technical Conference, Workshop and Exhibit. 2004. (Year: 2004).*

(Continued)

*Primary Examiner* — Cuong H Nguyen
(74) *Attorney, Agent, or Firm* — Fogg & Powers LLC

(57) ABSTRACT

Techniques are provided for a simplified system to verify proper operation of an Air-data system. The simplified system includes the Air-data system and at least one LiDAR system each of which is on or in a vehicle. Each LiDAR system emits and receives optical signals along a different line of sight. Data from each LiDAR system and the Air-data system are used to verify proper operation of the Air-data system. If operation is not verified, then an alert is transmitted indicating a potential fault in the Air-data system.

20 Claims, 8 Drawing Sheets

(56) References Cited

U.S. PATENT DOCUMENTS

| | | | | |
|---|---|---|---|---|
| 7,171,315 | B2 * | 1/2007 | Loose | G01F 1/3259 702/45 |
| 8,434,358 | B2 | 5/2013 | Asahara et al. | |
| 8,527,233 | B2 | 9/2013 | McIntyre | |
| 11,686,742 | B2 | 6/2023 | Naslund et al. | |
| 2016/0231348 | A1 | 8/2016 | Lacondemine et al. | |
| 2017/0276790 | A1 | 9/2017 | Lodden et al. | |
| 2018/0186468 | A1 | 7/2018 | Songa et al. | |
| 2019/0217966 | A1 | 7/2019 | Winter | |
| 2023/0358779 | A1 | 11/2023 | Landers et al. | |

FOREIGN PATENT DOCUMENTS

| | | | | | |
|---|---|---|---|---|---|
| CN | 115963292 | A | * | 4/2023 | Y02A 90/30 |
| CN | 110733651 | B | * | 8/2023 | B64D 33/04 |
| DE | 60205851 | T2 | * | 6/2006 | G01C 21/165 |
| FR | 3093567 | A1 | * | 9/2020 | G01S 17/95 |
| JP | 5618313 | B2 | | 9/2014 | |
| WO | WO-2015049647 | A1 | * | 4/2015 | B03C 3/366 |

OTHER PUBLICATIONS

Carryer, J. Andrew.an abstract for “Intelligent agent control of an unmanned aerial vehicle”. Diss. Carleton University, 2005. (Year: 2006).*

Karlgaard, Christopher D., et al. An abstract of “Mars science laboratory entry atmospheric data system trajectory and atmosphere reconstruction.” Journal of Spacecraft and Rockets 51.4 (2014): 1029-1047. (Year: 2014).*

De Almeida, H.M., 2018. Induced Drag Reduction with a Wing Tip Tail Configuration (Master’s thesis, Universidade da Beira Interior (Portugal)). (Year: 2018).*

European Patent Office, “Extended European Search Report”, dated Oct. 20, 2025, from EP Application No. 25174300.1, from Foreign Counterpart to U.S. Appl. No. 18/678,257, pp. 1 through 10, Published: EP.

* cited by examiner

Figure 2A:
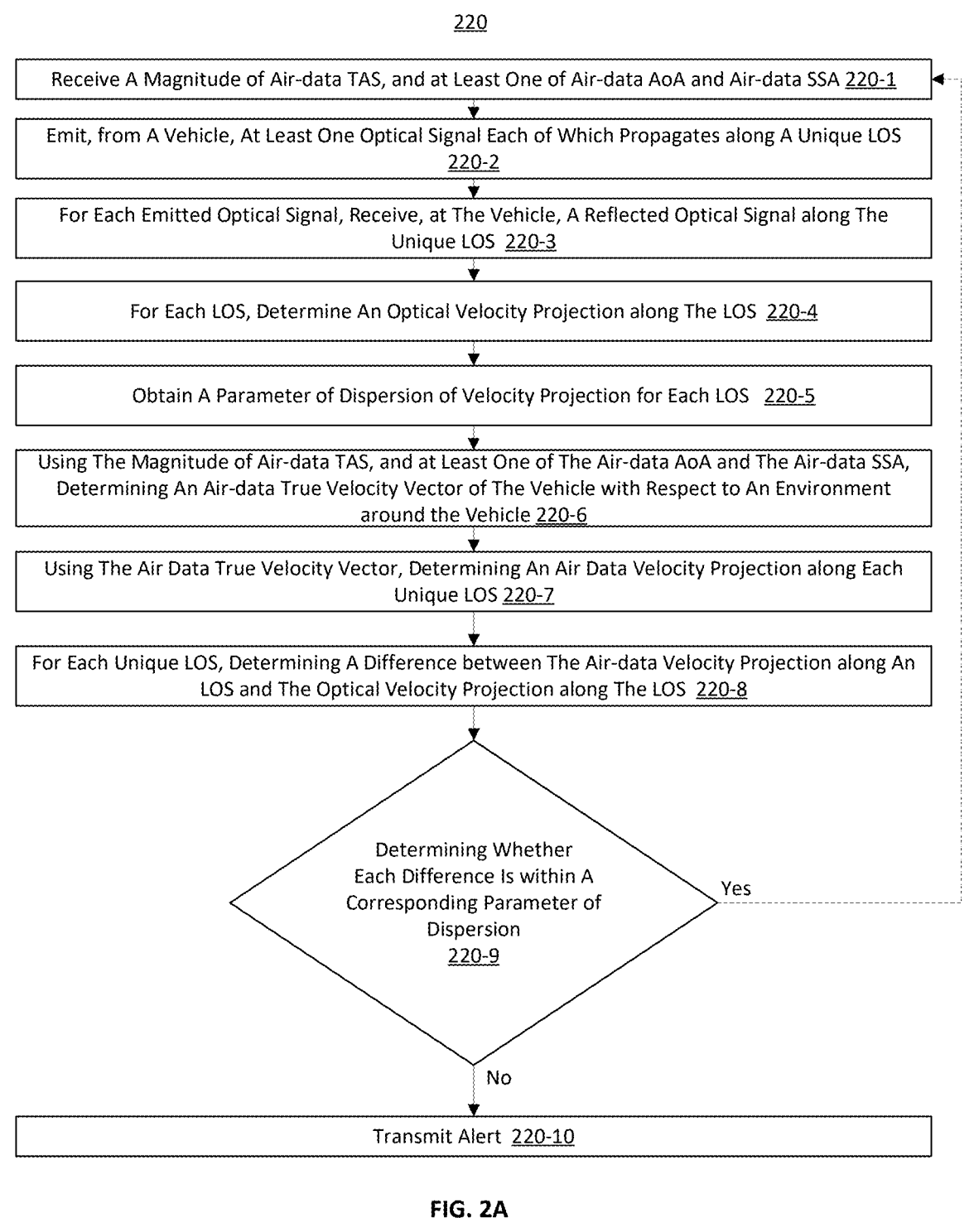

220

Receive A Magnitude of Air-data TAS, and at Least One of Air-data AoA and Air-data SSA 220-1

Emit, from A Vehicle, At Least One Optical Signal Each of Which Propagates along A Unique LOS 220-2

For Each Emitted Optical Signal, Receive, at The Vehicle, A Reflected Optical Signal along The Unique LOS 220-3

For Each LOS, Determine An Optical Velocity Projection along The LOS 220-4

Obtain A Parameter of Dispersion of Velocity Projection for Each LOS 220-5

Using The Magnitude of Air-data TAS, and at Least One of The Air-data AoA and The Air-data SSA, Determining An Air-data True Velocity Vector of The Vehicle with Respect to An Environment around the Vehicle 220-6

Using The Air Data True Velocity Vector, Determining An Air Data Velocity Projection along Each Unique LOS 220-7

For Each Unique LOS, Determining A Difference between The Air-data Velocity Projection along An LOS and The Optical Velocity Projection along The LOS 220-8

Determining Whether Each Difference Is within A Corresponding Parameter of Dispersion 220-9

Yes

No

Transmit Alert 220-10

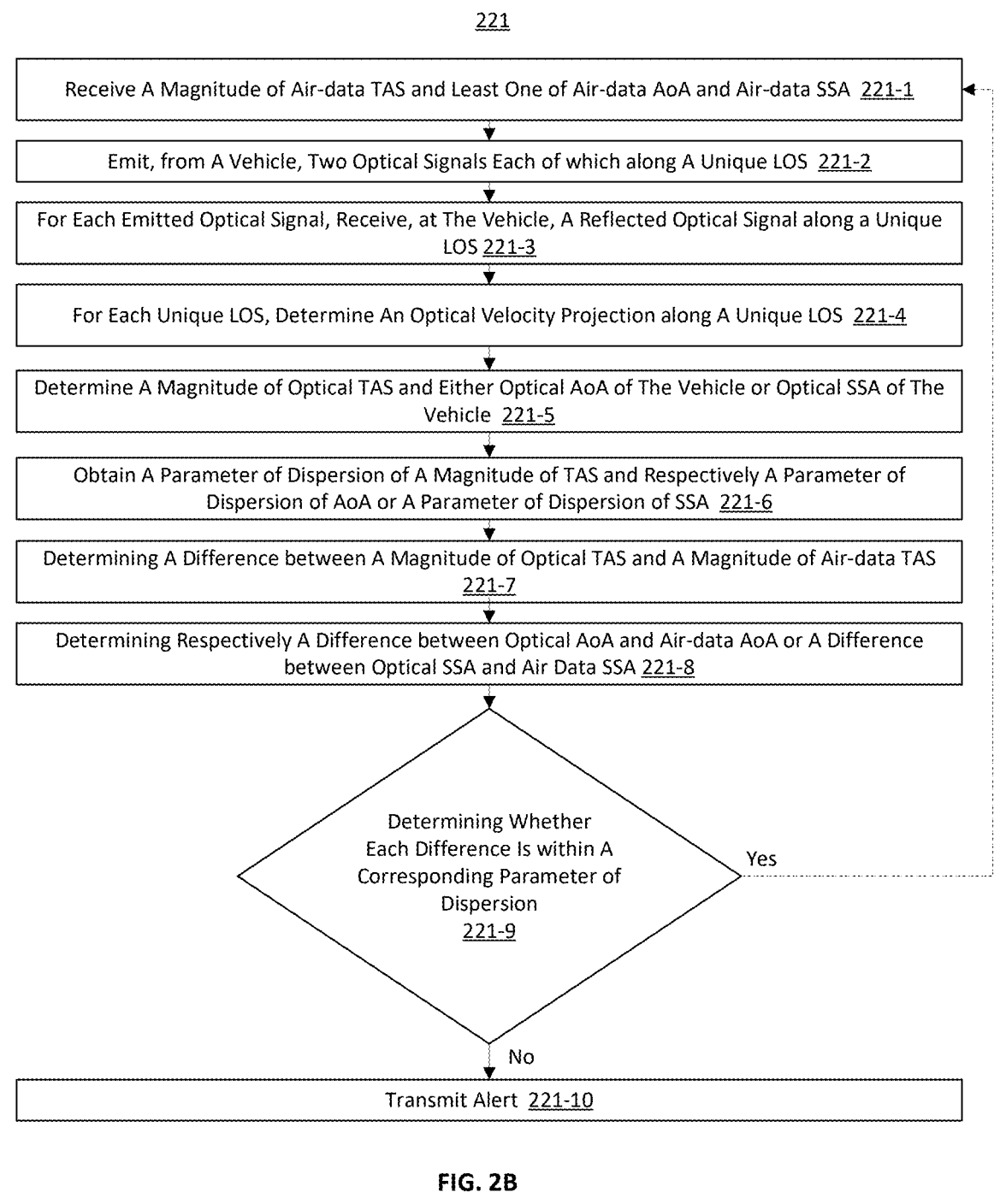

Receive A Magnitude of Air-data TAS and Least One of Air-data AoA and Air-data SSA 221-1

Emit, from A Vehicle, Two Optical Signals Each of which along A Unique LOS 221-2

For Each Emitted Optical Signal, Receive, at The Vehicle, A Reflected Optical Signal along a Unique LOS 221-3

For Each Unique LOS, Determine An Optical Velocity Projection along A Unique LOS 221-4

Determine A Magnitude of Optical TAS and Either Optical AoA of The Vehicle or Optical SSA of The Vehicle 221-5

Obtain A Parameter of Dispersion of A Magnitude of TAS and Respectively A Parameter of Dispersion of AoA or A Parameter of Dispersion of SSA 221-6

Determining A Difference between A Magnitude of Optical TAS and A Magnitude of Air-data TAS 221-7

Determining Respectively A Difference between Optical AoA and Air-data AoA or A Difference between Optical SSA and Air Data SSA 221-8

Determining Whether Each Difference Is within A Corresponding Parameter of Dispersion 221-9

Yes

No

Transmit Alert 221-10

FIG. 2B

TECHNIQUES FOR ASSURING ACCURACY OF AIR-DATA SYSTEMS

BACKGROUND

Air-data systems including pitot probes and angle of attack vanes are critical in ensuring flight safety of an aircraft.

If such systems operate improperly, e.g. due to pitot probes becoming clogged, for example by ice, sand, dirt, and/or insect nests, inaccurate or unreliable readings are provided to human and/or autopilots. Such inaccuracy in air-data measurement or even erroneous data output can be misinterpreted by aircraft crew, leading to dangerous situations such as aircraft stalls, over-speeds, or complete loss of aircraft control. These events historically happened with a severe impact to aviation: loss of aircraft vehicles and/or human lives, both on passengers' and crew site.

It has been proposed to complement or replace the Air-data system with a standalone LiDAR system, including at least three LiDAR measurement channels, configured to characterize similar air-data information. However, such adoption has been undermined because a standalone LiDAR system is complex in comparison with a conventional Air-data system.

SUMMARY

In some aspects, the techniques described herein relate to a method for determining whether an air-data measurement system of a vehicle is properly operating, wherein each air-data measurement system includes at least one pitot-static probe, the method including: one of: (a) receiving a magnitude of an air-data true airspeed (TAS) and at least one of an air-data angle of attack (AoA) and an air-data sideslip angle (SSA) from the air-data measurement system; emitting, from the vehicle, at least one optical signal, wherein each optical signal is emitted along a different line of sight (LOS) at a different region of atmosphere outside of the vehicle; for each emitted optical signal, receiving, at the vehicle, a reflected optical signal, wherein each reflected optical is a reflection, from the different region of atmosphere, of at least a portion of an emitted optical signal emitted along the different LOS; for each different LOS, determining, using data derived from a pair of optical signals emitted and reflected, an optical velocity projection, of the vehicle, along the different LOS with respect to the atmosphere about the vehicle; obtaining a parameter of dispersion of velocity projection for each different LOS; using the magnitude of the air-data TAS, and at least one of the air-data AoA and the air-data SSA, determining an air-data true velocity vector of the vehicle with respect to an environment around the vehicle; using the air-data true velocity vector, determining an air-data velocity projection along each different LOS; for each different LOS, determining a difference between the air-data velocity projection along the different LOS and the optical velocity projection along the different LOS; determining whether at least one difference is not within a corresponding parameter of dispersion; and determining that the at least one difference is not within the corresponding parameter of dispersion, then transmitting an alert about a potential problem with the air-data measurement system; (b) receiving the magnitude of the air-data TAS and at least one of the air-data AoA and the air-data SSA from the air-data measurement system; emitting, from the vehicle, two optical signals, wherein each optical signal is emitted along the different LOS at the different region of atmosphere outside of the vehicle; for each emitted optical signal, receiving, at the vehicle, the reflected optical signal, wherein each reflected optical is the reflection, from the different region of atmosphere, of at least the portion of the emitted optical signal emitted along the different LOS; for each different LOS, determining, using data derived from the pair of optical signals emitted and reflected, the optical velocity projection, of the vehicle, along the different LOS with respect to the atmosphere about the vehicle; determining a magnitude of an optical TAS and either an optical AoA of the vehicle or the optical SSA of the vehicle; obtaining a parameter of dispersion of a magnitude of TAS, and either a parameter of dispersion of AoA if the optical AoA was determined or a parameter of dispersion of SSA if the optical SSA was determined; determining a difference between the magnitude of the optical TAS and the magnitude of the air-data TAS; determining either a difference between the optical AoA and the air-data AoA if the optical AoA was determined or a difference between the optical SSA and the air-data SSA if optical SSA was determined; determining whether the at least one difference is not within the corresponding parameter of dispersion; and determining that the at least one difference is not within the corresponding parameter of dispersion, then transmitting the alert about the potential problem with the air-data measurement system; and (c) receiving the magnitude of air-data TAS, the air-data AoA and the air-data SSA from the air-data measurement system; emitting, from the vehicle, at least three optical signals, wherein each optical signal is emitted along the different LOS at the different region of atmosphere outside of the vehicle; for each emitted optical signal, receiving, at the vehicle, the reflected optical signal, wherein each reflected optical is the reflection, from the different region of atmosphere, of at least the portion of the emitted optical signal emitted along the different LOS; for each different LOS, determining, using data derived from the pair of optical signals emitted and reflected, the optical velocity projection, of the vehicle, along the different LOS with respect to the atmosphere about the vehicle; determining the magnitude of the optical TAS of the vehicle, the optical AoA of the vehicle, and the optical SSA of the vehicle; obtaining the parameter of dispersion of the magnitude of TAS, the parameter of dispersion of AoA, and the parameter of dispersion of SSA; determining a difference between the magnitude of the optical TAS and the magnitude of the air-data TAS, a difference between the optical AoA and the air-data AoA, and a difference between the optical SSA and the air-data SSA; determining whether the at least one difference is not within the corresponding parameter of dispersion; and determining that the at least one difference is not within the corresponding parameter of dispersion, then transmitting the alert about the potential problem with the air-data measurement system.

In some aspects, the techniques described herein relate to a non-transitory computer readable medium storing a program causing at least one processor to execute a process for determining whether an air-data measurement system of a vehicle is properly operating, wherein each air-data measurement system includes at least one pitot-static probe, the process including: one of: (a) receiving a magnitude of air-data true airspeed (TAS) and at least one of an air-data angle of attack (AoA) and an air-data sideslip angle (SSA) from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from a pair of optical signals emitted and reflected, an optical velocity projection, of the vehicle, along the different LOS with respect to the atmosphere about the vehicle; obtaining a parameter of dispersion of velocity projection for each different LOS; using the magnitude of the air-data TAS, and at least one of the air-data AoA and the air-data SSA, determining an air-data true velocity vector of the vehicle with respect to an environment around the vehicle; using the air-data true velocity vector, determining an air-data velocity projection along each different LOS; for each different LOS, determining a difference between the air-data velocity projection along the different LOS and the optical velocity projection along the different LOS; determining whether at least one difference is not within a corresponding parameter of dispersion; and determining that the at least one difference is not within the corresponding parameter of dispersion, then causing transmission of an alert about a potential problem with the air-data measurement system; (b) receiving the magnitude of the air-data TAS and at least one of the air-data AoA and the air-data SSA from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from the pair of optical signals emitted and reflected, the optical velocity projection, of the vehicle, along the different LOS with respect to the atmosphere about the vehicle; determining a magnitude of an optical TAS and either an optical AoA of the vehicle or the optical SSA of the vehicle; obtaining a parameter of dispersion of a magnitude of TAS, and either a parameter of dispersion of AoA if the optical AoA was determined or a parameter of dispersion of SSA if the optical SSA was determined; determining a difference between the magnitude of the optical TAS and the magnitude of the air-data TAS; determining either a difference between the optical AoA and the air-data AoA if the optical AoA was determined or a difference between the optical SSA and the air-data SSA if optical SSA was determined; determining whether the at least one difference is not within the corresponding parameter of dispersion; and determining that the at least one difference is not within the corresponding parameter of dispersion, then causing transmission of the alert about the potential problem with the air-data measurement system; and (c) receiving the magnitude of the air-data TAS, the air-data AoA and the air-data SSA from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from the pair of optical signals emitted and reflected, the optical velocity projection, of the vehicle, along the different LOS with respect to the atmosphere about the vehicle; determining the magnitude of the optical TAS of the vehicle, the optical AoA of the vehicle, and the optical SSA of the vehicle; obtaining the parameter of dispersion of a magnitude of TAS, the parameter of dispersion of AoA, and the parameter of dispersion of SSA; determining a difference between the magnitude of the optical TAS and the magnitude of the air-data TAS, a difference between the optical AoA and the air-data AoA, and a difference between the optical SSA and the air-data SSA; determining whether the at least one difference is not within the corresponding parameter of dispersion; and determining that the at least one difference is not within the corresponding parameter of dispersion, then causing transmission of the alert about the potential problem with the air-data measurement system.

In some aspects, the techniques described herein relate to an apparatus for determining whether an air-data measurement system of a vehicle is properly operating, wherein each air-data measurement system includes at least one pitot-static probe, the apparatus including: a processing system including at least one processor circuitry and at least one memory circuit; the processing system configured to: one of: (a) receive a magnitude of an air-data true airspeed (TAS) and at least one of an air-data angle of attack (AoA) and an air-data sideslip angle (SSA) from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from a pair of optical signals emitted and reflected, an optical velocity projection, of the vehicle, along the different LOS with respect to the atmosphere about the vehicle; obtain a parameter of dispersion of velocity projection for each different LOS; using the magnitude of the air-data TAS, and at least one of the air-data AoA and the air-data SSA, determine an air-data true velocity vector of the vehicle with respect to an environment around the vehicle; using the air-data true velocity vector, determine an air-data velocity projection along each different LOS; for each different LOS, determine a difference between the air-data velocity projection along the different LOS and the optical velocity projection along the different LOS; determine whether at least one difference is not within a corresponding parameter of dispersion; and determine that the at least one difference is not within the corresponding parameter of dispersion, then cause transmission of an alert about a potential problem with the air-data measurement system; (b) receive the magnitude of the air-data TAS and at least one of the air-data AoA and the air-data SSA from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from the pair of optical signals emitted and reflected, the optical velocity projection, of the vehicle, along the different LOS with respect to the atmosphere about the vehicle; determine a magnitude of an optical TAS and either an optical AoA of the vehicle or the optical SSA of the vehicle; obtain a parameter of dispersion of the magnitude of TAS, and either a parameter of dispersion of AoA if the optical AoA was determined or a parameter of dispersion of SSA if the optical SSA was determined; determine a difference between the magnitude of the optical TAS and the magnitude of the air-data TAS; determine either a difference between the optical AoA and the air-data AoA if the optical AoA was determined or a difference between the optical SSA and the air-data SSA if optical SSA was determined; determine whether the at least one difference is not within the corresponding parameter of dispersion; and determine that the at least one difference is not within the corresponding parameter of dispersion, then causing transmission of the alert about the potential problem with the air-data measurement system; and (c) receive the magnitude of the air-data TAS, the air-data AoA and the air-data SSA from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from the pair of optical signals emitted and reflected, the optical velocity projection, of the vehicle, along the different LOS with respect to the atmosphere about the vehicle; determine the magnitude of the optical TAS of the vehicle, the optical AoA of the vehicle, and the optical SSA of the vehicle; obtain the parameter of dispersion of the magnitude of TAS, the parameter of dispersion of AoA, and the parameter of dispersion of SSA; determine a difference between the magnitude of the optical TAS and the magnitude of the air-data TAS, a difference between the optical AoA and the air-data AoA, and a difference between the optical SSA and the air-data SSA; determine whether the at least one difference is not within the corresponding parameter of dispersion; and determine that the at least one difference is not within the corresponding parameter of dispersion, then causing transmission of the alert about the potential problem with the air-data measurement system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 2A illustrates a flow diagram of an exemplary method for determining whether there is a fault with a component of an Air-data system;

FIG. 2B illustrates a flow diagram of another exemplary method for determining whether there is a fault with a component of an Air-data system.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
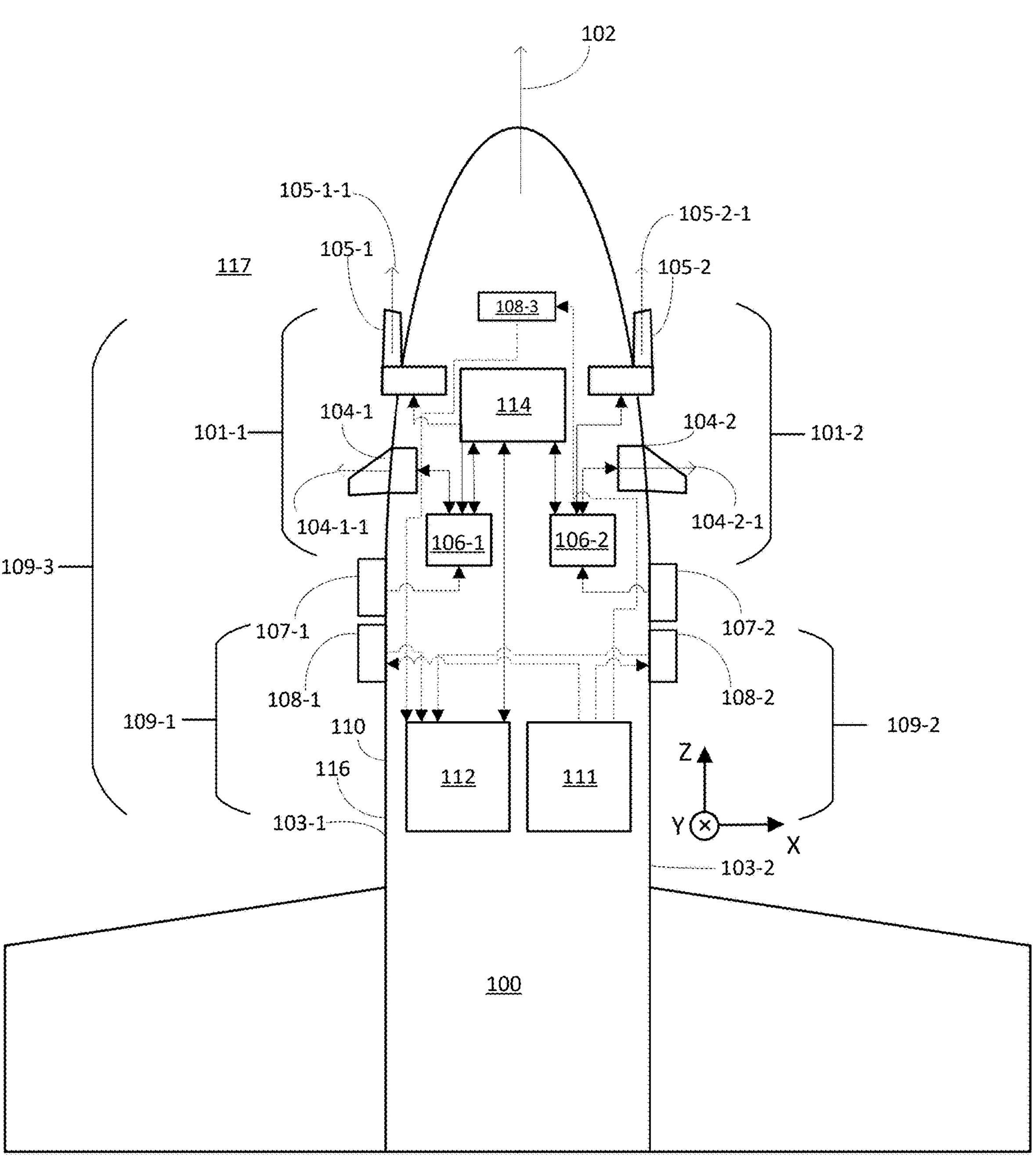
FIG. 1A illustrates a top down view of a diagram of a vehicle including, for pedagogical purposes, two Air-data systems (or units) and three LiDAR systems.

In the following detailed description, reference is made to the accompanying drawings that form a part hereof, and in which is shown by way of illustration specific illustrative embodiments. However, it is to be understood that other embodiments may be utilized, and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention provide a technological improvement to flight control safety by error checking of a vehicle Air-data system with a lower cost optical LiDAR system(s). Embodiments of the invention utilized a simplified and less expensive optical system to verify proper operation, or integrity verification or checking, of data provided by an Air-data system. The simplified and less expensive optical system includes at least one LiDAR system. The Air-data system and each LiDAR system is on or in a vehicle. Optionally, such vehicle is an airborne vehicle for example an aircraft.

Each LiDAR system projects an optical signal at a different angle with respect to a longitudinal axis of a body of the vehicle. The longitudinal axis is an axis bisecting a body of the vehicle and is parallel with an intended forward direction of the vehicle.

Each LiDAR system emits an optical signal and receives a reflected optical signal along a different pair of substantially parallel directions or Line-of-Sight (LOS) directions. For pedagogical purposes, LOS shall refer to the LOS of the received, reflected optical signal. Data about the emitted optical signal and reflected optical signal (derived from the emitted optical signal) propagating along a LOS direction are used to determine at least a projected velocity along the LOS direction. The emitted optical signal may also be referred herein as a transmitted optical signal. Each LOS direction is defined by two Euler angles: alpha ($\alpha$) (with respect to axis X of the body of the vehicle) and beta ($\beta$) (with respect to axis Y of the body of the vehicle). The longitudinal axis Z is orthogonal to each of axis X and axis Y, and is an axis bisecting a body of the vehicle; axis Z has its origin at the center of gravity of the vehicle and is directed forward, parallel to the vehicle fuselage reference line.

Data from each LiDAR system and the air-data system are used to verify proper operation of the Air-data system. If one or more pieces of data obtained from the Air-data system or derived from data from the Air-data system is deemed to be inaccurate, e.g., not within a corresponding parameter of dispersion, then at least one: crew of the vehicle are alerted to a potential problem with the Air-data system and (b) other aircraft system(s), e.g., an autopilot, no longer use data from the Air-data system or constituent component(s) of the Air-data system, e.g., pitot probe or angle of attack vane, deemed to be faulty. True airspeed means a speed, i.e., a magnitude of velocity, of the vehicle relative to the environment, e.g., the air or atmosphere, through which the vehicle travels.

FIG. 1A illustrates a top down view of a diagram of a vehicle 100 including, for pedagogical purposes, two Air-data systems (or units) and three LiDAR systems. In FIG. 1A, a first Air-data system 101-1 is on a first side 103-1 of the vehicle 100, e.g., where the captain (or pilot) is located, and a second Air-data system 101-2 is on a second side 103-2 (opposite the first side) of the vehicle 100, e.g., where the first officer (or co-pilot) is located. Only at least one Air-data system is needed and at least one LiDAR system is needed.

Figure 1B:
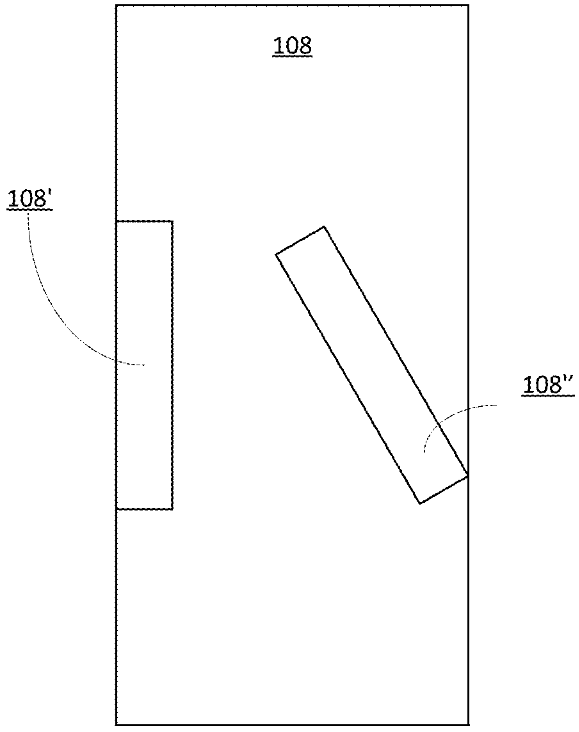
FIG. 1B illustrates a diagram of one embodiment of a portion of an optical head including an optical window and one or more optical lenses.
Figure 1C:
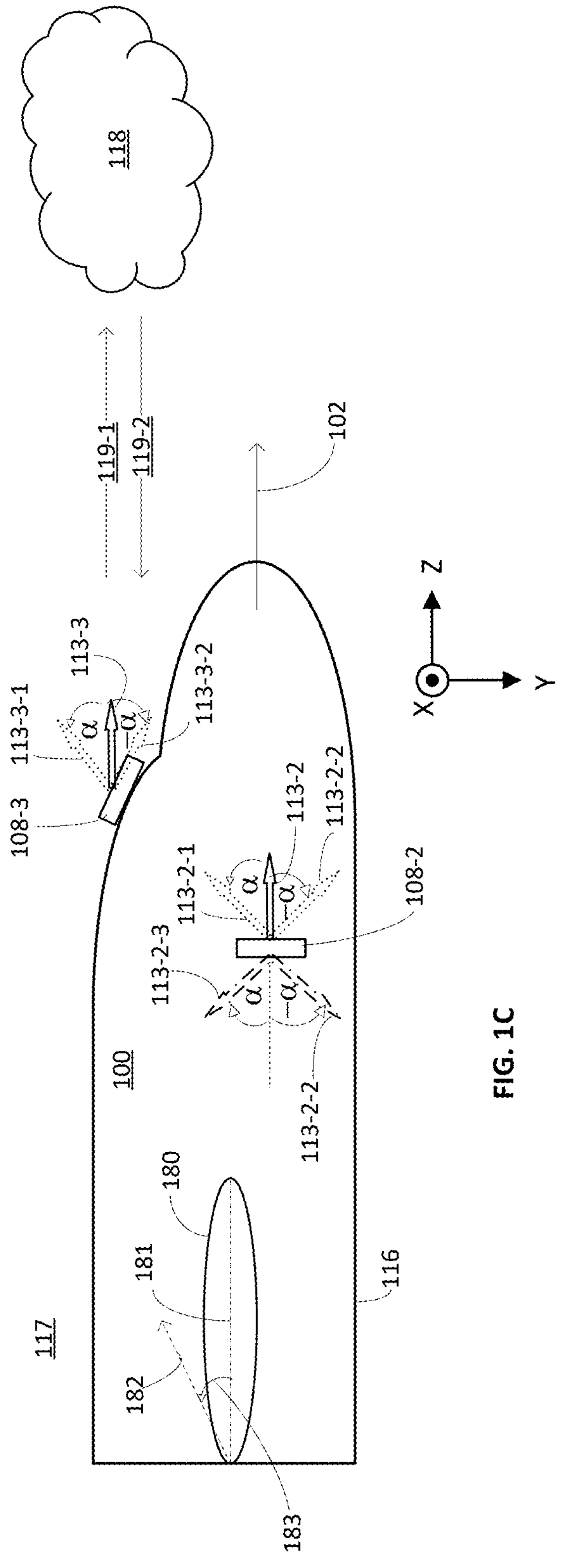
FIG. 1C illustrates a diagram of a body of a vehicle and potential LOSs.
Figure 1D:
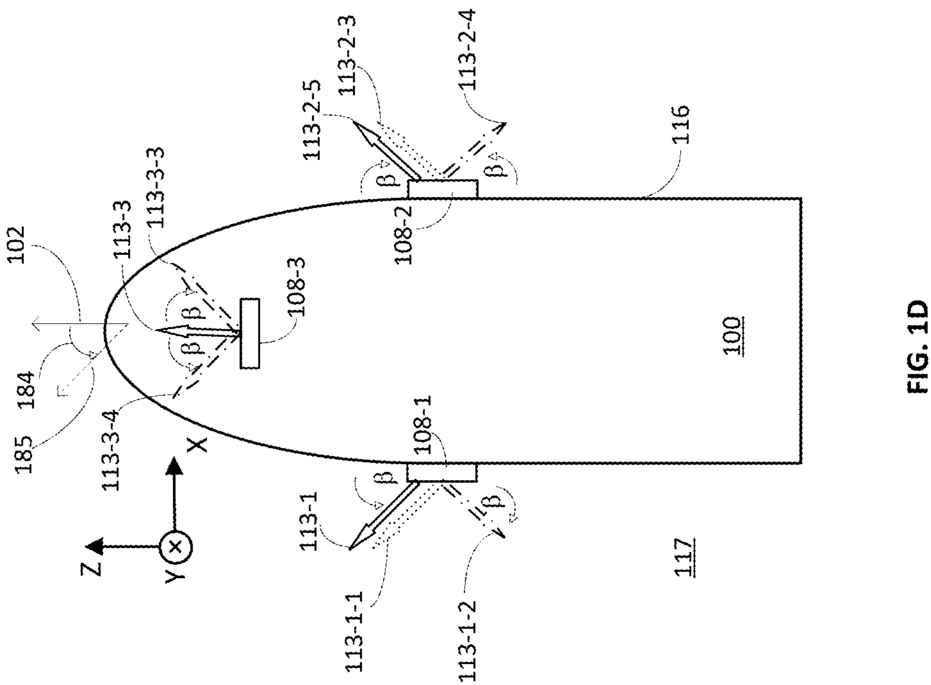
FIG. 1D illustrates a diagram of a body of a vehicle and other potential LOSs.

Each Air-data system 101-1, 101-2 includes an angle of attack (AoA) vane 104-1, 104-2, a pitot-static probe 105-1, 105-2, and air-data processing system (or circuitry) (ADPS) 106-1, 106-2, e.g., an air-data inertial reference unit or air-data computer (ADIRU). Each of the AoA vane 104-1, 104-2 and the pitot-static probe 105-1, 105-2 are electrically or otherwise communicatively coupled to the ADPS 106-1, 106-2. Optionally, a longitudinal axis 105-1-1, 105-2-1 of each pitot-static probe 105-1, 105-2 is parallel to a longitudinal axis 102, e.g., a z-axis Z, of a body 116 of the vehicle 100. In FIGS. 1A, 1C, and 1D, the longitudinal axis 102 is the Z axis z or is parallel to the Z axis z. Optionally, an axis of rotation 104-1-1, 104-2-1 of each AoA vane 104-1, 104-2 is orthogonal to the longitudinal axis 102 of the body 116 of the vehicle 100. A pitot-static probe means a combination of a pitot tube and a static port or a pitot-static tube.

Optionally, each Air-data system 101-1, 101-2 also includes an optional a static port 107-1, 107-2 configured to measure static pressure about the vehicle 100. For pedagogical purposes, each optional static port 107-1, 107-2 is illustrated as being electrical coupled or otherwise communicatively coupled to a unique ADPS 106-1, 106-2; however, one altimeter may be electrical coupled or otherwise communicatively coupled to a single ADPS.

Each ADPS 106-1, 106-2 includes a processing system (or processing circuitry), e.g., comprising processor circuitry electrically coupled to memory circuitry. Each ADPS 106-1, 106-2 also optionally includes inertial measurement components, e.g., at least one accelerometer and/or at least one gyroscope, and is configured to provide air-data and inertial reference data to at least one other processing system (or circuitry), e.g., a flight control unit. The air-data includes, for example, true airspeed, angle of attack, sideslip angle, and/or altitude. The inertial reference data includes, for example, position and attitude.

Each LiDAR system 109-1, 109-2, 109-3 includes at least one optical head 108-1, 108-2, 108-3 including one or more optical windows (through each of which an optical signal and a reflected optical signal, derived from the optical signal, are respectively transmitted and received along a unique or different line of sight), one or more optical lenses, one or more optical fiber couplers, and/or one or more mirrors. FIG. 1B illustrates a diagram of one embodiment of a portion of an optical head 108 including an optical window 108' and one or more optical lenses 108". The one or more optical lenses 108" are used to define a line of sight in which an optical signal and a reflected optical signal, derived from the optical signal, are respectively emitted from and received by the optical head 108.

Returning to FIG. 1A, each of a first optical head 108-1 and a second optical head 108-2 is configured to emit each of at least one optical signal along a unique line of sight and for, each optical signal, to receive a reflected optical signal along the same line of sight that the optical signal was emitted. Optionally, each line of sight is defined by a first angle $\alpha$ around a first axis, e.g., the x-axis X, and with respect to one of two other axis orthogonal to the first axis, and by a second angle $\beta$ around a second axis, e.g., the y-axis Y, which is orthogonal to the first axis and a third axis. The third axis, e.g., the z-axis Z, is orthogonal to each of the first and the second axes. Optionally, the first angle $\alpha$ may range from zero to three hundred and sixty degrees around the first axis, e.g., the x-axis X and the second angle $\beta$ may range between negative ninety and ninety degrees around the second axis, e.g., the y-axis Y. Optionally, the first angle $\alpha$ may be non-zero and the second angle $\beta$ may be zero or vice versa. Optionally, the third axis is the same as or parallel to the longitudinal axis 102 of the body 116 of the vehicle 100.

FIG. 1C illustrates a diagram of a body 116 of a vehicle 100 and potential LOSs. The different potential LOSs each have a different first angle $\alpha$ around the first axis and, e.g., with respect to the second or the third axis. A received optical signal 119-2 is a portion of the transmitted optical signal 119-1 and is reflected, from a region of environment 118, back along a LOS substantially parallel to another LOS along which the transmitted optical signal propagated. In one embodiment, an optical head 108-2, 108-3, has a LOS 113-2, 113-3 that is parallel and/or anti-parallel with respect to a longitudinal axis of a body of the vehicle, i.e., along or parallel the third axis; thus, the first angle $\alpha$ and the second angle $\beta$ are each zero. In another embodiment, an optical head 108-2, 108-3 has one or two LOSs 113-2-1, 113-2-2, 113-3-1, 113-3-2 each of which point obliquely in a direction of the longitudinal axis 102 of the body 116 of the vehicle 100 and are rotated around the first axis by a first angle $\alpha$ that is non-zero; optionally, for two LOSs, one LOS is rotated around the first axis by the first angle $\alpha$ and the other LOS is rotated around the first axis by a negative first angle $-\alpha$. In another embodiment, an optical head 108-2, 108-3 has one or two LOSs 113-2-3, 113-2-4 each of which point obliquely away from a direction of the longitudinal axis 102 of the body 116 of the vehicle 100 and are rotated around the first axis by a first angle $\alpha$ that is non-zero; optionally, for two LOSs, one LOS is rotated around the first axis by the first angle $\alpha$ and the other LOS is rotated around the first axis by a negative first angle $-\alpha$; optionally, the second angle $\beta$ for each LOS is non-zero. Angle of attack 183 is a pitch angle between a chord 181 of an airfoil 180 of the body 116 of the vehicle 100 and a vector 182 representing relative motion between the body 116 and the environment, e.g., the atmosphere 117, through which the body 116 is moving.

FIG. 1D illustrates a diagram of a body 116 of a vehicle 100 and other potential LOSs. Each other potential different LOSs has a different second angle $\beta$ around the second axis and, e.g., with respect to the first or the third axis. A received optical signal is a portion of the transmitted optical signal and is reflected, from a region of environment, back along the same LOS along which the transmitted optical signal propagated. In one embodiment, an optical head 108-3, has a LOS 113-3 that is parallel and/or anti-parallel with respect to a longitudinal axis of a body of the vehicle, i.e., along or parallel the third axis; thus, the second angle $\beta$ is zero. In another embodiment, an optical head 108-2, 108-3 has one or two LOSs 113-1, 113-1-1, 113-1-2, 113-2-3, 113-2-4, 113-2-5, 113-3-3, 113-3-4 each of which point obliquely in or opposite to a direction of the longitudinal axis 102 of the body 116 of the vehicle 100 and are rotated around the second axis by a second angle $\beta$ that is non-zero; optionally, for two LOSs 113-1-1, 113-1-2, 113-2-3, 113-2-4, 113-3-3,

113-3-4, one LOS 113-1-1, 113-2-3, 113-3-3 is rotated around the second axis by the second angle β and the other LOS 113-1-2, 113-2-4, 113-3-4 is rotated around the second axis by the second angle β. In another embodiment, an optical head 108-2, 108-3 has one or two LOSs 113-2-3, 113-2-4 each of which point obliquely away from a direction of the longitudinal axis 102 of the body 116 of the vehicle 100 and are rotated around the second axis by a second angle β that is non-zero; optionally, for two LOSs, one LOS is rotated around the second axis by the second angle β and the other LOS is rotated around the second axis by a second angle β. Sideslip angle 184 means a yaw angle between the longitudinal axis 102 of the body 116 of the vehicle 100 and a direction of travel 185 of the body 116 of the vehicle 100.

When an embodiment of the invention utilizes a single LOS, then only a single LiDAR system and a single optical head 108-1, 108-2, 108-3, are utilized. Thus, one of the illustrated optical heads 108-1, 108-2, 108-3 would emit an optical signal and receive a reflected optical signal along a single LOS. Optionally, in such an embodiment, the angle β is non-zero to avoid boundary affects between an environment around the body 116, e.g., atmosphere, 117 and the body 116.

Returning to FIG. 1A, each optical head 108-1, 108-2, 108-3 is mounted on an exterior 110 of and/or in a body 116 of the vehicle 100 so that the optical head is exposed through the exterior 110 of the body 116. Optionally, one or more of the optical heads is mounted flush with an exterior surface of the body 116. Each LiDAR system 109-1, 109-2 includes an optical source 111, e.g., a laser. Optionally, each LiDAR system 109-1, 109-2 includes a LiDAR detection/processing system (or circuitry) 112.[1] The optical source 111 and/or the LiDAR detection/processing system 112 may be shared by more than one LiDAR system 109-1, 109-2, e.g., more than one optical head 108-1, 108-2, 108-3. For pedagogical purposes, FIG. 1A illustrates that the optical source 111 and the LiDAR detection/processing system 112 are shared by each optical head 108-1, 108-2, 108-3.

[1] FIG. 1A illustrates, for pedagogical purposes, three LIDAR systems 109-1, 109-2, 109-3. An exemplary first LIDAR system includes a first optical head 108-1, an optical source 111, and a LIDAR detection/processing system 112. A exemplary second LIDAR system includes a second optical head 108-2, the optical source 111, and the LIDAR detection/processing system 112. An exemplary third LIDAR system includes a third optical head 108-3, the optical source 111, and the LIDAR detection/processing system 112. Thus, for pedagogical purposes and optionally, each LIDAR system shares the optical source 111 and the LIDAR detection/processing system 112.

Each optical head 108-1, 108-2, 108-3 is optically coupled to the optical source 111 and a LiDAR detection/processing system 112. The optical source 111 is configured to generate the optical signal. The LiDAR detection/processing system 112 is optionally configured to detect, e.g., a frequency of, the reflected optical signal. Because a frequency of the transmitted optical signal along a LOS is known and a frequency of the reflected optical signal along the LOS is detected, an optical velocity projection along the LOS is determined using Doppler frequency processing techniques, e.g., by the LiDAR detection/processing system 112. Using Doppler frequency processing techniques, the optical velocity projection along an LOS is a function of the frequency of the emitted optical signal and the reflected optical signal. In this manner, an optical velocity projection along each LOS can be determined.

Figure 1E:
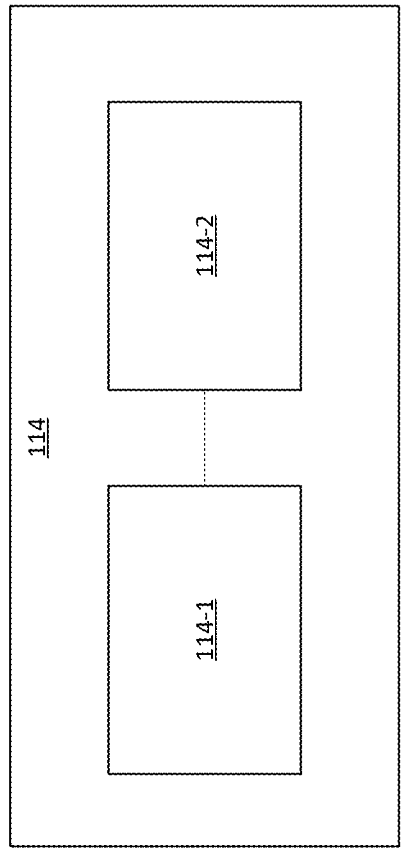
FIG. 1E illustrates a block diagram of one embodiment of a flight processing system.

A flight processing system (or circuitry) 114, which optionally includes a flight controller, is configured to receive data from one or more ADPS 106-1, 106-2 and one or more LiDAR detection/processing system 112. FIG. 1E illustrates a block diagram of one embodiment of a flight processing system 114 comprising processing circuitry 114-1 electrically coupled to memory circuitry 114-2. The flight processing system 114 is configured to perform one or more of the methods described elsewhere herein. Although the flight processing system 114 is illustrated as being a separate entity distinct from ADPSs 106-1, 106-2 and the one or more LiDAR detection/processing system 112, one or both of (a) the ADPSs 106-1, 106-2 and (b) the one or more LiDAR detection/processing system 112 may be combined with the flight processing system 114.

FIG. 2A illustrates a flow diagram of an exemplary method 220 for determining whether there is a fault with a component of an Air-data system. Exemplary method 220 may be implemented by one or more of the apparatuses illustrated in FIGS. 1A-1E. To the extent the methods herein are described herein as being implemented with one or more of the apparatuses illustrated in FIGS. 1A-1E, it is to be understood that other embodiments can be implemented in other ways. Techniques described with respect to the embodiments illustrated by FIGS. 1A-1E may be applicable to the method 220.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220-1, a magnitude of air-data true air speed (TAS), and at least one of air-data Angle of Attack (AoA) and air-data side slip angle (SSA) of a vehicle are received, e.g., from an Air-data system. In block 220-2, at least one optical signal is emitted (from the vehicle, e.g., a unique optical head) each of which propagates along a unique LOS. Each of the at least one optical signal is emitted to a different or unique region of environment, e.g., region of atmosphere. In block 220-3, for each emitted optical signal, a reflected optical signal is received at the vehicle (or the body thereof), e.g., at the unique optical head (on or in the body of the vehicle) which emitted the optical signal. The reflected optical signal is a portion of one emitted optical signal which was reflected by a unique region of environment, e.g., a unique region of atmosphere. The reflected optical signal propagates along an LOS which is substantially parallel to another LOS along which the transmitted optical signal propagated; the reflected optical signal was derived from such transmitted optical signal.

In block 220-4, for each LOS, an optical velocity projection, along an LOS, is determined using a pair of emitted and reflected optical signals propagating along the LOS. Each optical velocity projection is determined using Doppler velocity techniques discussed elsewhere herein. A pair of emitted and reflected optical signals are an emitted optical signal and a reflected optical signal is formed from a portion of the emitted optical signal reflected by a region of environment, e.g., region of atmosphere. Optionally, such pair are transmitted from and received by the same optical head, e.g., through the same optical window therein.

In block 220-5, a parameter of dispersion of a velocity projection for each LOS is obtained. Optionally, the parameter of dispersion of velocity projection for each LOS may be derived, at least in part, from data from the optical signal(s) propagating along a LOS. Optionally, the parameter of dispersion of velocity projection for each LOS is the same. Optionally, each parameter of dispersion described herein may be a range, a standard deviation, or a variance.

Optionally, each parameter of dispersion described herein is obtained from a user (e.g., a vehicle crew member or a vehicle maintenance person), the flight processing system, another system on the vehicle, or from a system external to the vehicle; thus, optionally, each parameter of dispersion may be stored in the flight processing system.

In block 220-6, using the magnitude of air-data TAS and the at least one of the air-data AoA and the air-data SSA, an air-data true velocity vector of the vehicle is determined with respect to the environment, e.g., the atmosphere, around the vehicle. The air-data true velocity vector is determined using a velocity magnitude and two angles. Optionally, if only one of the air-data AoA and the air-data SSA is received, then the air-data angle which is not received is assumed to be zero when making the determination.

In block 220-7, using the air-data true velocity vector, an air-data velocity projection along each unique LOS is determined. The air-data velocity projection along an LOS may be determined by determining a scalar product of the air-data true velocity vector and a unit vector describing a direction of the LOS.

In block 220-8, for each unique LOS, a difference between the air-data velocity projection along an LOS and the optical velocity projection along the LOS is determined. In block 220-9, for each LOS, whether a difference is within a parameter of dispersion of the velocity projection for an LOS is determined. Optionally, if for each LOS, the difference is within the parameter of dispersion of the velocity projection for the LOS, then proceed to block 220-1. If at least one difference for an LOS is not within the parameter of dispersion of velocity projection for the LOS, then in block 220-10, an alert about a potential problem, e.g., with the Air-data system (for example a component thereof such as a pitot-static probe, is transmitted to vehicle crew and/or a vehicle system.

FIG. 2B illustrates a flow diagram of another exemplary method 221 for determining whether there is a fault with a component of an Air-data system. Exemplary method 221 may be implemented by one or more of the apparatuses illustrated in FIGS. 1A-1E. To the extent the methods herein are described herein as being implemented with one or more of the apparatuses illustrated in FIGS. 1A-1E, it is to be understood that other embodiments can be implemented in other ways. Techniques described with respect to the embodiments illustrated by FIGS. 1A-1E may be applicable to the method 221.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 221-1, a magnitude of the air-data TAS and at least one of air-data AoA and air-data SSA of a vehicle are received, e.g., from an Air-data system. In block 221-2, two optical signals are emitted from the vehicle each of which propagates along a unique LOS. Optionally, the two optical signals are emitted from different optical heads. Each of the two optical signals is emitted at a different region of environment, e.g., region of atmosphere. In block 221-3, for each emitted optical signal, a reflected optical signal is received, at the vehicle (or the body thereof or an optical head in and/or on the body), along a unique LOS. The reflected optical signal is a portion of an emitted optical signal which was reflected by a unique region of environment, e.g., region of atmosphere. The reflected optical signal propagates along an LOS which is substantially parallel to another LOS along which the transmitted optical signal propagated; the reflected optical signal was derived from such transmitted optical signal.

In block 221-4, for each unique LOS, an optical velocity projection along a unique LOS is determined. The optical velocity projection is determined using Doppler frequency techniques described elsewhere herein, and utilize data about the emitted and the reflected optical signals which propagate along the unique LOS.

In block 221-5, a magnitude of optical TAS and either optical AoA or optical SSA of the vehicle are determined. If only one optical angle was received in block 221-1, then optical AoA is determined if Air-data AoA was received in block 221-1 or optical SSA is determined if Air-data SSA was received in block 221-1. Optionally, if only optical AoA is determined, then optical SSA is assumed to be zero. Optionally, if only optical SSA is determined, then optical AoA is assumed to be zero. The magnitude of optical TAS, the optical AoA, and the optical SSA can be determined using the optical velocity projection along each unique LOS and each LOS direction unit vector with respect to a coordinate system of the environment.

In block 221-6, a parameter of dispersion of the magnitude of TAS and respectively a parameter of dispersion of AoA or a parameter of dispersion of SSA are obtained. A parameter of dispersion of AoA is obtained if optical AoA is determined. A parameter of dispersion of SSA is obtained if optical SSA is determined. Such parameters of dispersion may be provided by a user or obtained by as system as discussed elsewhere herein. In block 221-7, a difference between the magnitude of the optical TAS and the magnitude of the air-data TAS is determined.

In block 221-8, respectively a difference between the optical AoA and the air-data AoA or a difference between the optical SSA and the air-data SSA is determined. A difference between optical AoA and the air-data AoA is obtained if optical AoA is determined. A difference between optical SSA and the air-data SSA is obtained if optical SSA is determined.

In block 221-9, whether each difference is within a corresponding parameter of dispersion. In other words, whether each of (a) the difference between the magnitude of the optical TAS and the magnitude of the air-data TAS is within the parameter of dispersion of the magnitude of the TAS and (b) (i) the difference between the optical AoA and the air-data AoA is within the parameter of dispersion of AoA when optical AoA is determined or (ii) the difference between the optical SSA and the air-data SSA is within the parameter of dispersion of SSA when optical SSA is determined.

Optionally, if each difference is within the corresponding parameter of dispersion, then proceed to block 221-1. If each difference is not within the corresponding parameter of dispersion, then in block 221-10 an alert about a potential problem, e.g., with the Air-data system (or for example a component thereof such as a pitot-static probe, is transmitted to vehicle crew and/or a vehicle system. In other words, if (a) the difference between the magnitude of the optical TAS and the magnitude of the air-data TAS is not within the parameter of dispersion of the magnitude of TAS and/or (b) (i) the difference between the optical AoA and the air-data AoA is not within the parameter of dispersion of AoA when optical AoA is determined or (ii) the difference between the optical SSA and the air-data SSA is not within the parameter of dispersion of SSA when optical SSA is determined, then send the alert.

Figure 2C:
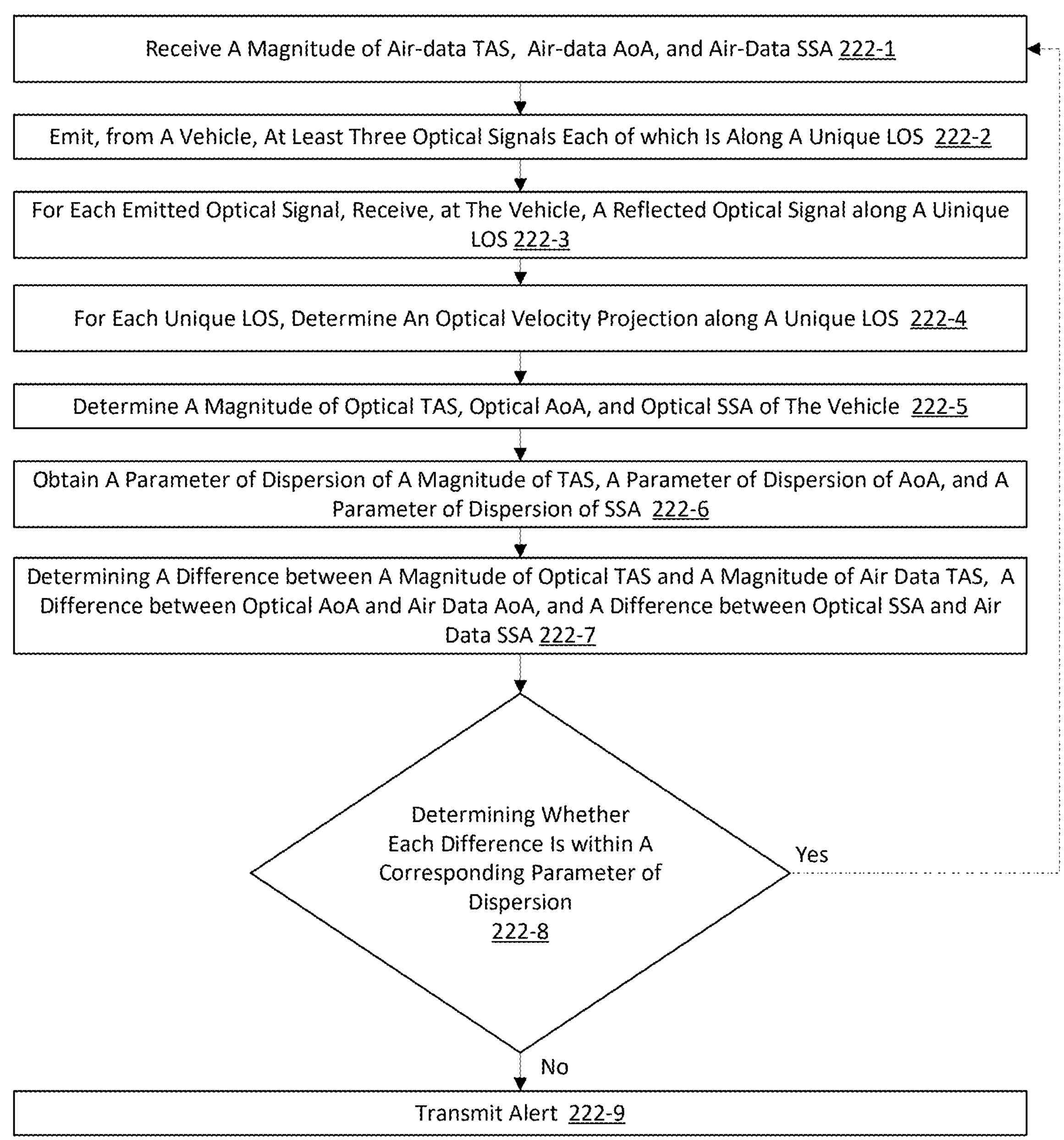
FIG. 2C illustrates a flow diagram of yet another exemplary method for determining whether there is a fault with a component of an Air-data system.

FIG. 2C illustrates a flow diagram of yet another exemplary method 222 for determining whether there is a fault with a component of an Air-data system. Exemplary method 222 may be implemented by one or more of the apparatuses illustrated in FIGS. 1A-1E. To the extent the methods herein are described herein as being implemented with one or more of the apparatuses illustrated in FIGS. 1A-1E, it is to be understood that other embodiments can be implemented in other ways. Techniques described with respect to the embodiments illustrated by FIGS. 1A-1E may be applicable to the method 222.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 222-1, a magnitude of air-data TAS, air-data AoA, and air-data SSA of a vehicle are received, e.g., from an Air-data system. In block 222-2, at least three optical signals are emitted from the vehicle. Each of the three optical signals is emitted along a unique LOS. Each of the three optical signals is emitted at a different region of environment, e.g., region of atmosphere. Optionally, each of two or more of the three optical signals are emitted from a unique optical head. In block 222-3, for each emitted optical signal, a reflected optical signal is received, at the vehicle (or the body thereof or an optical head in and/or on the body), along a unique LOS. The reflected optical signal is a portion of an emitted optical signal which was reflected by a unique region of environment, e.g., region of atmosphere. The reflected optical signal propagates along the same unique LOS as the transmitted optical signal from which the reflected optical signal was derived.

In block 222-4, for each unique LOS, an optical velocity projection along a unique LOS is determined. The optical velocity projection is determined using Doppler frequency techniques described elsewhere herein, and utilize data about the emitted and the reflected optical signals which propagate along the unique LOS.

In block 222-5, a magnitude of optical TAS, an optical AoA, and an optical SSA of the vehicle are determined. If only optical AoA is determined, then optical SSA is assumed to be zero. If only optical SSA is determined, then optical AoA is assumed to be zero. Optical TAS, optical AoA, and optical SSA can be determined using the optical velocity projection along each unique LOS and each LOS direction unit vector with respect to a coordinate system of the environment.

In block 222-6, a parameter of dispersion of the magnitude of TAS, a parameter of dispersion of AoA, and a parameter of dispersion of SSA are obtained. Such parameters of dispersion may be provided by a user or obtained by as system as discussed elsewhere herein. In block 222-7, a difference between the magnitude of the optical TAS and the magnitude of the air-data TAS, a difference between the optical AoA and the air-data AoA, and a difference between the optical SSA and the air-data SSA are determined.

In block 222-8, whether each difference is within a corresponding parameter of dispersion. In other words, whether each of (a) the difference between the magnitude of the optical TAS and the magnitude of the air-data TAS is within the parameter of dispersion the magnitude of TAS, (b) the difference between the optical AoA and the air-data AoA is within the parameter of dispersion of AoA, and (c) the difference between the optical SSA and the air-data SSA is within the parameter of dispersion of SSA is determined.

Optionally, if each difference is within the corresponding parameter of dispersion, then proceed to block 222-1. If each difference is not within the corresponding parameter of dispersion, then in block 222-9 an alert about a potential problem, e.g., with the Air-data system (or for example a component thereof such as a pitot-static probe, is transmitted to vehicle crew and/or a vehicle system. In other words, if (a) the difference between the magnitude of the optical TAS and the magnitude of the air-data TAS is not within the parameter of dispersion the magnitude of TAS, (b) the difference between the optical AoA and the air-data AoA is not within the parameter of dispersion of AoA, and/or (c) the difference between the optical SSA and the air-data SSA is not within the parameter of dispersion of SSA, then send the alert.

Optionally, an optical signal is emitted along a LOS that is either parallel or anti-parallel with respect to a longitudinal axis of a body of the vehicle. The magnitude of the optical TAS is obtained using data derived from an emitted optical signal along an LOS and a reflected optical signal propagated along another LOS (substantially parallel to the LOS) when each of AoA and SSA are equal to zero.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk—Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

EXAMPLE EMBODIMENTS

Example 1 includes a method for determining whether an air-data measurement system of a vehicle is properly operating, wherein each air-data measurement system comprises at least one pitot-static probe, the method comprising: one of: receiving a magnitude of an air-data true airspeed (TAS) and at least one of an air-data angle of attack (AoA) and an air-data sideslip angle (SSA) from the air-data measurement system; emitting, from the vehicle, at least one optical signal, wherein each optical signal is emitted along a different line of sight (LOS) at a different region of atmosphere outside of the vehicle; for each emitted optical signal, receiving, at the vehicle, a reflected optical signal, wherein each reflected optical is a reflection, from the different region of atmosphere, of at least a portion of an emitted optical signal emitted along the different LOS; for each different LOS, determining, using data derived from a pair of optical signals emitted and reflected, an optical velocity projection, of the vehicle, along the different LOS with respect to the atmosphere about the vehicle; obtaining a parameter of dispersion of velocity projection for each different LOS; using the magnitude of the air-data TAS, and at least one of the air-data AoA and the air-data SSA, determining an air-data true velocity vector of the vehicle with respect to an environment around the vehicle; using the air-data true velocity vector, determining an air-data velocity projection along each different LOS; for each different LOS, determining a difference between the air-data velocity projection along the different LOS and the optical velocity projection along the different LOS; determining whether at least one difference is not within a corresponding parameter of dispersion; and determining that the at least one difference is not within the corresponding parameter of dispersion, then transmitting an alert about a potential problem with the air-data measurement system; receiving the magnitude of the air-data TAS and at least one of the air-data AoA and the air-data SSA from the air-data measurement system; emitting, from the vehicle, two optical signals, wherein each optical signal is emitted along the different LOS at the different region of atmosphere outside of the vehicle; for each emitted optical signal, receiving, at the vehicle, the reflected optical signal, wherein each reflected optical is the reflection, from the different region of atmosphere, of at least the portion of the emitted optical signal emitted along the different LOS; for each different LOS, determining, using data derived from the pair of optical signals emitted and reflected, the optical velocity projection, of the vehicle, along the different LOS with respect to the atmosphere about the vehicle; determining a magnitude of an optical TAS and either an optical AoA of the vehicle or the optical SSA of the vehicle; obtaining a parameter of dispersion of a magnitude of TAS, and either a parameter of dispersion of AoA if the optical AoA was determined or a parameter of dispersion of SSA if the optical SSA was determined; determining a difference between the magnitude of the optical TAS and the magnitude of the air-data TAS; determining either a difference between the optical AoA and the air-data AoA if the optical AoA was determined or a difference between the optical SSA and the air-data SSA if optical SSA was determined; determining whether the at least one difference is not within the corresponding parameter of dispersion; and determining that the at least one difference is not within the corresponding parameter of dispersion, then transmitting the alert about the potential problem with the air-data measurement system; and receiving the magnitude of air-data TAS, the air-data AoA and the air-data SSA from the air-data measurement system; emitting, from the vehicle, at least three optical signals, wherein each optical signal is emitted along the different LOS at the different region of atmosphere outside of the vehicle; for each emitted optical signal, receiving, at the vehicle, the reflected optical signal, wherein each reflected optical is the reflection, from the different region of atmosphere, of at least the portion of the emitted optical signal emitted along the different LOS; for each different LOS, determining, using data derived from the pair of optical signals emitted and reflected, the optical velocity projection, of the vehicle, along the different LOS with respect to the atmosphere about the vehicle; determining the magnitude of the optical TAS of the vehicle, the optical AoA of the vehicle, and the optical SSA of the vehicle; obtaining the parameter of dispersion of the magnitude of TAS, the parameter of dispersion of AoA, and the parameter of dispersion of SSA; determining a difference between the magnitude of the optical TAS and the magnitude of the air-data TAS, a difference between the optical AoA and the air-data AoA, and a difference between the optical SSA and the air-data SSA; determining whether the at least one difference is not within the corresponding parameter of dispersion; and determining that the at least one difference is not within the corresponding parameter of dispersion, then transmitting the alert about the potential problem with the air-data measurement system.

Example 2 includes the method of Example 1, wherein only the air-data AoA is received from the air-data measurement system, then the air-data SSA is set to zero; wherein only the air-data SSA is received from the air-data measurement system, then the air-data AoA is set to zero.

Example 3 includes the method of any of Examples 1-2, wherein only the optical AoA is determined, then the optical SSA is set to be zero; wherein only the optical SSA is determined, then the optical AoA is set to zero.

Example 4 includes the method of any of Examples 1-3, wherein each parameter of dispersion is configured to be obtained from a user, a system, or is derived from LiDAR and/or air-data measurements.

Example 5 includes the method of any of Examples 1-4, wherein the at least one optical signal consists of the two optical signals; wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis; wherein the first optical signal is rotated by a second angle around the second axis orthogonal to each of the longitudinal axis and the first axis, and the second optical signal is rotated by the second angle around the second axis.

Example 6 includes the method of any of Examples 1-5, wherein the at least one optical signal, the two optical signals, and the at least three optical signals each comprise an optical signal emitted along a LOS that is either parallel or anti-parallel with respect to a longitudinal axis of a body of the vehicle; wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

Example 7 includes the method of any of Examples 1-6, wherein the parameter of dispersion for each different LOS is equal.

Example 8 includes a non-transitory computer readable medium storing a program causing at least one processor to execute a process for determining whether an air-data measurement system of a vehicle is properly operating, wherein each air-data measurement system comprises at least one pitot-static probe, the process comprising: one of: receiving a magnitude of air-data true airspeed (TAS) and at least one of an air-data angle of attack (AoA) and an air-data sideslip angle (SSA) from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from a pair of optical signals emitted and reflected, an optical velocity projection, of the vehicle, along the different LOS with respect to the atmosphere about the vehicle; obtaining a parameter of dispersion of velocity projection for each different LOS; using the magnitude of the air-data TAS, and at least one of the air-data AoA and the air-data SSA, determining an air-data true velocity vector of the vehicle with respect to an environment around the vehicle; using the air-data true velocity vector, determining an air-data velocity projection along each different LOS; for each different LOS, determining a difference between the air-data velocity projection along the different LOS and the optical velocity projection along the different LOS; determining whether at least one difference is not within a corresponding parameter of dispersion; and determining that the at least one difference is not within the corresponding parameter of dispersion, then causing transmission of an alert about a potential problem with the air-data measurement system; receiving the magnitude of the air-data TAS and at least one of the air-data AoA and the air-data SSA from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from the pair of optical signals emitted and reflected, the optical velocity projection, of the vehicle, along the different LOS with respect to the atmosphere about the vehicle; determining a magnitude of an optical TAS and either an optical AoA of the vehicle or the optical SSA of the vehicle; obtaining a parameter of dispersion of a magnitude of TAS, and either a parameter of dispersion of AoA if the optical AoA was determined or a parameter of dispersion of SSA if the optical SSA was determined; determining a difference between the magnitude of the optical TAS and the magnitude of the air-data TAS; determining either a difference between the optical AoA and the air-data AoA if the optical AoA was determined or a difference between the optical SSA and the air-data SSA if optical SSA was determined; determining whether the at least one difference is not within the corresponding parameter of dispersion; and determining that the at least one difference is not within the corresponding parameter of dispersion, then causing transmission of the alert about the potential problem with the air-data measurement system; and receiving the magnitude of the air-data TAS, the air-data AoA and the air-data SSA from the air-data measurement system; causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determining, using data derived from the pair of optical signals emitted and reflected, the optical velocity projection, of the vehicle, along the different LOS with respect to the atmosphere about the vehicle; determining the magnitude of the optical TAS of the vehicle, the optical AoA of the vehicle, and the optical SSA of the vehicle; obtaining the parameter of dispersion of a magnitude of TAS, the parameter of dispersion of AoA, and the parameter of dispersion of SSA; determining a difference between the magnitude of the optical TAS and the magnitude of the air-data TAS, a difference between the optical AoA and the air-data AoA, and a difference between the optical SSA and the air-data SSA; determining whether the at least one difference is not within the corresponding parameter of dispersion; and determining that the at least one difference is not within the corresponding parameter of dispersion, then causing transmission of the alert about the potential problem with the air-data measurement system.

Example 9 includes the non-transitory computer readable medium of Example 8, wherein only the air-data AoA is received from the air-data measurement system, then the air-data SSA is set to zero; wherein only the air-data SSA is received from the air-data measurement system, then the air-data AoA is set to zero.

Example 10 includes the non-transitory computer readable medium of any of Examples 8-9, wherein only the optical AoA is determined, then the optical SSA is set to be zero; wherein only the optical SSA is determined, then the optical AoA is set to zero.

Example 11 includes the non-transitory computer readable medium of any of Examples 8-10, wherein each parameter of dispersion is configured to be obtained from a user, a system, or is derived from LiDAR and/or air-data measurements.

Example 12 includes the non-transitory computer readable medium of any of Examples 8-11, wherein the at least one optical signal consists of the two optical signals; wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis; wherein the first optical signal is rotated by a second angle around the second axis orthogonal to each of the longitudinal axis and the first axis, and the second optical signal is rotated by the second angle around the second axis.

Example 13 includes the non-transitory computer readable medium of any of Examples 8-12, wherein the at least one optical signal, the two optical signals, and the at least three optical signals each comprise an optical signal emitted along a LOS that is either parallel or anti-parallel with respect to a longitudinal axis of a body of the vehicle; wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

Example 14 includes the non-transitory computer readable medium of any of Examples 8-13, wherein the parameter of dispersion for each different LOS is equal.

Example 15 includes an apparatus for determining whether an air-data measurement system of a vehicle is properly operating, wherein each air-data measurement system comprises at least one pitot-static probe, the apparatus comprising: a processing system comprising at least one processor circuitry and at least one memory circuit; the processing system configured to: one of: receive a magnitude of an air-data true airspeed (TAS) and at least one of an air-data angle of attack (AoA) and an air-data sideslip angle (SSA) from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from a pair of optical signals emitted and reflected, an optical velocity projection, of the vehicle, along the different LOS with respect to the atmosphere about the vehicle; obtain a parameter of dispersion of velocity projection for each different LOS; using the magnitude of the air-data TAS, and at least one of the air-data AoA and the air-data SSA, determine an air-data true velocity vector of the vehicle with respect to an environment around the vehicle; using the air-data true velocity vector, determine an air-data velocity projection along each different LOS; for each different LOS, determine a difference between the air-data velocity projection along the different LOS and the optical velocity projection along the different LOS; determine whether at least one difference is not within a corresponding parameter of dispersion; and determine that the at least one difference is not within the corresponding parameter of dispersion, then cause transmission of an alert about a potential problem with the air-data measurement system; receive the magnitude of the air-data TAS and at least one of the air-data AoA and the air-data SSA from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from the pair of optical signals emitted and reflected, the optical velocity projection, of the vehicle, along the different LOS with respect to the atmosphere about the vehicle; determine a magnitude of an optical TAS and either an optical AoA of the vehicle or the optical SSA of the vehicle; obtain a parameter of dispersion of the magnitude of TAS, and either a parameter of dispersion of AoA if the optical AoA was determined or a parameter of dispersion of SSA if the optical SSA was determined; determine a difference between the magnitude of the optical TAS and the magnitude of the air-data TAS; determine either a difference between the optical AoA and the air-data AoA if the optical AoA was determined or a difference between the optical SSA and the air-data SSA if optical SSA was determined; determine whether the at least one difference is not within the corresponding parameter of dispersion; and determine that the at least one difference is not within the corresponding parameter of dispersion, then causing transmission of the alert about the potential problem with the air-data measurement system; and receive the magnitude of the air-data TAS, the air-data AoA and the air-data SSA from the air-data measurement system; cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS; for each different LOS, determine, using data derived from the pair of optical signals emitted and reflected, the optical velocity projection, of the vehicle, along the different LOS with respect to the atmosphere about the vehicle; determine the magnitude of the optical TAS of the vehicle, the optical AoA of the vehicle, and the optical SSA of the vehicle; obtain the parameter of dispersion of the magnitude of TAS, the parameter of dispersion of AoA, and the parameter of dispersion of SSA; determine a difference between the magnitude of the optical TAS and the magnitude of the air-data TAS, a difference between the optical AoA and the air-data AoA, and a difference between the optical SSA and the air-data SSA; determine whether the at least one difference is not within the corresponding parameter of dispersion; and determine that the at least one difference is not within the corresponding parameter of dispersion, then causing transmission of the alert about the potential problem with the air-data measurement system.

Example 16 includes the apparatus of Example 15, wherein only the air-data AoA is received from the air-data measurement system, then the air-data SSA is set to zero; wherein only the air-data SSA is received from the air-data measurement system, then the air-data AoA is set to zero.

Example 17 includes the apparatus of any of Examples 15-16, wherein only the optical AoA is determined, then the optical SSA is set to be zero; wherein only the optical SSA is determined, then the optical AoA is set to zero.

Example 18 includes the apparatus of any of Examples 15-17, wherein each parameter of dispersion is configured to be obtained from a user, a system, or is derived from LiDAR and/or air-data measurements.

Example 19 includes the apparatus of any of Examples 15-18, wherein the at least one optical signal consists of the two optical signals; wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis; wherein the first optical signal is rotated by a second angle around the second axis orthogonal to each of the longitudinal axis and the first axis, and the second optical signal is rotated by the second angle around the second axis.

Example 20 includes the apparatus of any of Examples 15-19, wherein the at least one optical signal, the two optical signals, and the at least three optical signals each comprise an optical signal emitted along a LOS that is either parallel or anti-parallel with respect to a longitudinal axis of a body of the vehicle; wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for determining whether an air-data measurement system of a vehicle is properly operating, wherein each air-data measurement system comprises at least one pitot-static probe, the method comprising:

one of:

(a) receiving a magnitude of an air-data true airspeed (TAS) and at least one of an air-data angle of attack (AoA) and an air-data sideslip angle (SSA) from the air-data measurement system;

emitting, from the vehicle, at least one optical signal, wherein each optical signal is emitted along a different line of sight (LOS) at a different region of atmosphere outside of the vehicle;

for each emitted optical signal, receiving, at the vehicle, a reflected optical signal, wherein each reflected optical is a reflection, from the different region of atmosphere, of at least a portion of an emitted optical signal emitted along the different LOS;

for each different LOS, determining, using data derived from a pair of optical signals emitted and reflected, an optical velocity projection, of the vehicle, along the different LOS with respect to the atmosphere about the vehicle;

obtaining a parameter of dispersion of velocity projection for each different LOS;

using the magnitude of the air-data TAS, and at least one of the air-data AoA and the air-data SSA, determining an air-data true velocity vector of the vehicle with respect to an environment around the vehicle;

using the air-data true velocity vector, determining an air-data velocity projection along each different LOS;

for each different LOS, determining a difference between the air-data velocity projection along the different LOS and the optical velocity projection along the different LOS;

determining whether at least one difference is not within a corresponding parameter of dispersion; and determining that the at least one difference is not within the corresponding parameter of dispersion, then transmitting an alert about a potential problem with the air-data measurement system;

(b) receiving the magnitude of the air-data TAS and at least one of the air-data AoA and the air-data SSA from the air-data measurement system;

emitting, from the vehicle, two optical signals, wherein each optical signal is emitted along the different LOS at the different region of atmosphere outside of the vehicle;

for each emitted optical signal, receiving, at the vehicle, the reflected optical signal, wherein each reflected optical is the reflection, from the different region of atmosphere, of at least the portion of the emitted optical signal emitted along the different LOS;

for each different LOS, determining, using data derived from the pair of optical signals emitted and reflected, the optical velocity projection, of the vehicle, along the different LOS with respect to the atmosphere about the vehicle;

determining a magnitude of an optical TAS and either an optical AoA of the vehicle or the optical SSA of the vehicle;

obtaining a parameter of dispersion of a magnitude of TAS, and either a parameter of dispersion of AoA if the optical AoA was determined or a parameter of dispersion of SSA if the optical SSA was determined;

determining a difference between the magnitude of the optical TAS and the magnitude of the air-data TAS;

determining either a difference between the optical AoA and the air-data AoA if the optical AoA was determined or a difference between the optical SSA and the air-data SSA if optical SSA was determined;

determining whether the at least one difference is not within the corresponding parameter of dispersion; and determining that the at least one difference is not within the corresponding parameter of dispersion, then transmitting the alert about the potential problem with the air-data measurement system; and (c) receiving the magnitude of air-data TAS, the air-data AoA and the air-data SSA from the air-data measurement system;

emitting, from the vehicle, at least three optical signals, wherein each optical signal is emitted along the different LOS at the different region of atmosphere outside of the vehicle;

for each emitted optical signal, receiving, at the vehicle, the reflected optical signal, wherein each reflected optical is the reflection, from the different region of atmosphere, of at least the portion of the emitted optical signal emitted along the different LOS;

for each different LOS, determining, using data derived from the pair of optical signals emitted and reflected, the optical velocity projection, of the vehicle, along the different LOS with respect to the atmosphere about the vehicle;

determining the magnitude of the optical TAS of the vehicle, the optical AoA of the vehicle, and the optical SSA of the vehicle;

obtaining the parameter of dispersion of the magnitude of TAS, the parameter of dispersion of AoA, and the parameter of dispersion of SSA;

determining a difference between the magnitude of the optical TAS and the magnitude of the air-data TAS, a difference between the optical AoA and the air-data AoA, and a difference between the optical SSA and the air-data SSA;

determining whether the at least one difference is not within the corresponding parameter of dispersion; and determining that the at least one difference is not within the corresponding parameter of dispersion, then transmitting the alert about the potential problem with the air-data measurement system.

2. The method of claim 1, wherein only the air-data AoA is received from the air-data measurement system, then the air-data SSA is set to zero;

wherein only the air-data SSA is received from the air-data measurement system, then the air-data AoA is set to zero.

3. The method of claim 1, wherein only the optical AoA is determined, then the optical SSA is set to be zero;

wherein only the optical SSA is determined, then the optical AoA is set to zero.

4. The method of claim 1, wherein each parameter of dispersion is configured to be obtained from a user, a system, or is derived from LiDAR and/or air-data measurements.

5. The method of claim 1, wherein the at least one optical signal consists of the two optical signals;

wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis;

wherein the first optical signal is rotated by a second angle around the second axis orthogonal to each of the longitudinal axis and the first axis, and the second optical signal is rotated by the second angle around the second axis.

6. The method of claim 1, wherein the at least one optical signal, the two optical signals, and the at least three optical signals each comprise an optical signal emitted along a LOS that is either parallel or anti-parallel with respect to a longitudinal axis of a body of the vehicle;

wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

7. The method of claim 1, wherein the parameter of dispersion for each different LOS is equal.

8. A non-transitory computer readable medium storing a program causing at least one processor to execute a process for determining whether an air-data measurement system of a vehicle is properly operating, wherein each air-data measurement system comprises at least one pitot-static probe, the process comprising:

one of:

(a) receiving a magnitude of air-data true airspeed (TAS) and at least one of an air-data angle of attack (AoA) and an air-data sideslip angle (SSA) from the air-data measurement system;

causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determining, using data derived from a pair of optical signals emitted and reflected, an optical velocity projection, of the vehicle, along the different LOS with respect to the atmosphere about the vehicle;

obtaining a parameter of dispersion of velocity projection for each different LOS;

using the magnitude of the air-data TAS, and at least one of the air-data AoA and the air-data SSA, determining an air-data true velocity vector of the vehicle with respect to an environment around the vehicle;

using the air-data true velocity vector, determining an air-data velocity projection along each different LOS;

for each different LOS, determining a difference between the air-data velocity projection along the different LOS and the optical velocity projection along the different LOS;

determining whether at least one difference is not within a corresponding parameter of dispersion; and determining that the at least one difference is not within the corresponding parameter of dispersion, then causing transmission of an alert about a potential problem with the air-data measurement system;

(b) receiving the magnitude of the air-data TAS and at least one of the air-data AoA and the air-data SSA from the air-data measurement system;

causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determining, using data derived from the pair of optical signals emitted and reflected, the optical velocity projection, of the vehicle, along the different LOS with respect to the atmosphere about the vehicle;

determining a magnitude of an optical TAS and either an optical AoA of the vehicle or the optical SSA of the vehicle;

obtaining a parameter of dispersion of a magnitude of TAS, and either a parameter of dispersion of AoA if the optical AoA was determined or a parameter of dispersion of SSA if the optical SSA was determined;

determining a difference between the magnitude of the optical TAS and the magnitude of the air-data TAS;

determining either a difference between the optical AoA and the air-data AoA if the optical AoA was determined or a difference between the optical SSA and the air-data SSA if optical SSA was determined;

determining whether the at least one difference is not within the corresponding parameter of dispersion; and determining that the at least one difference is not within the corresponding parameter of dispersion, then causing transmission of the alert about the potential problem with the air-data measurement system; and (c) receiving the magnitude of the air-data TAS, the air-data AoA and the air-data SSA from the air-data measurement system;

causing emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determining, using data derived from the pair of optical signals emitted and reflected, the optical velocity projection, of the vehicle, along the different LOS with respect to the atmosphere about the vehicle;

determining the magnitude of the optical TAS of the vehicle, the optical AoA of the vehicle, and the optical SSA of the vehicle;

obtaining the parameter of dispersion of a magnitude of TAS, the parameter of dispersion of AoA, and the parameter of dispersion of SSA;

determining a difference between the magnitude of the optical TAS and the magnitude of the air-data TAS, a difference between the optical AoA and the air-data AoA, and a difference between the optical SSA and the air-data SSA;

determining whether the at least one difference is not within the corresponding parameter of dispersion; and determining that the at least one difference is not within the corresponding parameter of dispersion, then causing transmission of the alert about the potential problem with the air-data measurement system.

9. The non-transitory computer readable medium of claim 8, wherein only the air-data AoA is received from the air-data measurement system, then the air-data SSA is set to zero;

wherein only the air-data SSA is received from the air-data measurement system, then the air-data AoA is set to zero.

10. The non-transitory computer readable medium of claim 8, wherein only the optical AoA is determined, then the optical SSA is set to be zero;

wherein only the optical SSA is determined, then the optical AoA is set to zero.

11. The non-transitory computer readable medium of claim 8, wherein each parameter of dispersion is configured to be obtained from a user, a system, or is derived from LiDAR and/or air-data measurements.

12. The non-transitory computer readable medium of claim 8, wherein the at least one optical signal consists of the two optical signals;

wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis;

wherein the first optical signal is rotated by a second angle around the second axis orthogonal to each of the longitudinal axis and the first axis, and the second optical signal is rotated by the second angle around the second axis.

13. The non-transitory computer readable medium of claim 8, wherein the at least one optical signal, the two optical signals, and the at least three optical signals each comprise an optical signal emitted along a LOS that is either parallel or anti-parallel with respect to a longitudinal axis of a body of the vehicle;

wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

14. The non-transitory computer readable medium of claim 8, wherein the parameter of dispersion for each different LOS is equal.

15. An apparatus for determining whether an air-data measurement system of a vehicle is properly operating, wherein each air-data measurement system comprises at least one pitot-static probe, the apparatus comprising:

a processing system comprising at least one processor circuitry and at least one memory circuit;

the processing system configured to:

one of:

(a) receive a magnitude of an air-data true airspeed (TAS) and at least one of an air-data angle of attack (AoA) and an air-data sideslip angle (SSA) from the air-data measurement system;

cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determine, using data derived from a pair of optical signals emitted and reflected, an optical velocity projection, of the vehicle, along the different LOS with respect to the atmosphere about the vehicle;

obtain a parameter of dispersion of velocity projection for each different LOS;

using the magnitude of the air-data TAS, and at least one of the air-data AoA and the air-data SSA, determine an air-data true velocity vector of the vehicle with respect to an environment around the vehicle;

using the air-data true velocity vector, determine an air-data velocity projection along each different LOS;

for each different LOS, determine a difference between the air-data velocity projection along the different LOS and the optical velocity projection along the different LOS;

determine whether at least one difference is not within a corresponding parameter of dispersion; and determine that the at least one difference is not within the corresponding parameter of dispersion, then cause transmission of an alert about a potential problem with the air-data measurement system;

(b) receive the magnitude of the air-data TAS and at least one of the air-data AoA and the air-data SSA from the air-data measurement system;

cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determine, using data derived from the pair of optical signals emitted and reflected, the optical velocity projection, of the vehicle, along the different LOS with respect to the atmosphere about the vehicle;

determine a magnitude of an optical TAS and either an optical AoA of the vehicle or the optical SSA of the vehicle;

obtain a parameter of dispersion of the magnitude of TAS, and either a parameter of dispersion of AoA if the optical AoA was determined or a parameter of dispersion of SSA if the optical SSA was determined;

determine a difference between the magnitude of the optical TAS and the magnitude of the air-data TAS;

determine either a difference between the optical AoA and the air-data AoA if the optical AoA was determined or a difference between the optical SSA and the air-data SSA if optical SSA was determined;

determine whether the at least one difference is not within the corresponding parameter of dispersion; and determine that the at least one difference is not within the corresponding parameter of dispersion, then causing transmission of the alert about the potential problem with the air-data measurement system; and (c) receive the magnitude of the air-data TAS, the air-data AoA and the air-data SSA from the air-data measurement system;

cause emission, from the vehicle, at least one optical signal, wherein each optical signal is emitted along a different line of sight (LOS) at a different region of atmosphere outside of the vehicle, wherein for each emitted optical signal, a reflected optical signal is received at the vehicle, wherein each reflected optical is a reflection, from the different region of atmosphere, of at least a portion of an emitted optical signal emitted along the different LOS;

for each different LOS, determine, using data derived from the pair of optical signals emitted and reflected, the optical velocity projection, of the vehicle, along the different LOS with respect to the atmosphere about the vehicle;

determine the magnitude of the optical TAS of the vehicle, the optical AoA of the vehicle, and the optical SSA of the vehicle;

obtain the parameter of dispersion of the magnitude of TAS, the parameter of dispersion of AoA, and the parameter of dispersion of SSA;

determine a difference between the magnitude of the optical TAS and the magnitude of the air-data TAS, a difference between the optical AoA and the air-data AoA, and a difference between the optical SSA and the air-data SSA;

determine whether the at least one difference is not within the corresponding parameter of dispersion; and determine that the at least one difference is not within the corresponding parameter of dispersion, then causing transmission of the alert about the potential problem with the air-data measurement system.

16. The apparatus of claim 15, wherein only the air-data AoA is received from the air-data measurement system, then the air-data SSA is set to zero;

wherein only the air-data SSA is received from the air-data measurement system, then the air-data AoA is set to zero.

17. The apparatus of claim 15, wherein only the optical AoA is determined, then the optical SSA is set to be zero;

wherein only the optical SSA is determined, then the optical AoA is set to zero.

18. The apparatus of claim 15, wherein each parameter of dispersion is configured to be obtained from a user, a system, or is derived from LiDAR and/or air-data measurements.

19. The apparatus of claim 15, wherein the at least one optical signal consists of the two optical signals;

wherein a first optical signal of the two optical signals is rotated by a first angle around a first axis orthogonal to each of a longitudinal axis of a body of the vehicle and a second axis, and a second optical signal of the two optical signals is rotated by a negative first angle around the first axis;

wherein the first optical signal is rotated by a second angle around the second axis orthogonal to each of the longitudinal axis and the first axis, and the second optical signal is rotated by the second angle around the second axis.

20. The apparatus of claim 15, wherein the at least one optical signal, the two optical signals, and the at least three optical signals each comprise an optical signal emitted along a LOS that is either parallel or anti-parallel with respect to a longitudinal axis of a body of the vehicle;

wherein when each of the AoA and SSA are equal to zero, the magnitude of the optical TAS is obtained using data derived from the optical signal emitted along the LOS and another optical signal which is a portion, of the optical signal emitted, that is reflected back when each of AoA and SSA are equal to zero.

* * * * *